(12) United States Patent
Cruz Huertas et al.

(10) Patent No.: US 10,743,068 B2
(45) Date of Patent: Aug. 11, 2020

(54) REAL TIME DIGITAL MEDIA CAPTURE AND PRESENTATION

(71) Applicant: INTERNATIONAL BUSINESS MACHINES CORPORATION, Armonk, NY (US)

(72) Inventors: Luis C. Cruz Huertas, Heredia (CR); Rick A Hamilton, II, Charlottesville, VA (US); Ninad Sathaye, Bangalore (IN); Edgar A. Zamora Duran, Heredia (CR)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 16/132,692

(22) Filed: Sep. 17, 2018

(65) Prior Publication Data
US 2020/0092608 A1 Mar. 19, 2020

(51) Int. Cl.
| | | |
|---|---|---|
| *H04H 60/56* | (2008.01) | |
| *H04N 21/458* | (2011.01) | |
| *G06F 8/30* | (2018.01) | |
| *H04W 12/04* | (2009.01) | |
| *H04N 21/466* | (2011.01) | |
| *H04N 21/84* | (2011.01) | |

(Continued)

(52) U.S. Cl.
CPC ............. *H04N 21/458* (2013.01); *G06F 8/30* (2013.01); *G06F 8/60* (2013.01); *H04N 21/42201* (2013.01); *H04N 21/44218* (2013.01); *H04N 21/4667* (2013.01); *H04N 21/84* (2013.01); *H04W 12/04* (2013.01)

(58) Field of Classification Search
CPC ........... H04N 21/458; H04N 21/44218; H04N 21/42201; H04N 21/4667; H04N 21/84
USPC .......................................................... 725/12
See application file for complete search history.

(56) References Cited

U.S. PATENT DOCUMENTS

| | | | | | |
|---|---|---|---|---|---|
| 5,498,003 | A | * | 3/1996 | Gechter | ................... A63F 13/52 463/1 |
| 5,715,416 | A | * | 2/1998 | Baker | ...................... G06F 16/10 715/839 |

(Continued)

OTHER PUBLICATIONS

"10 Technologies You Will be Witnessing in the Near Future", Wonderful Engineering, by The Engineer 4 years ago, accessed on Apr. 24, 2018 3:49 PM, <http://wonderfulengineering.com/10-technologies-you-will-be-witnessing-in-the-near-future/>, pp. 1-9.

(Continued)

*Primary Examiner* — Michael B. Pierorazio
(74) *Attorney, Agent, or Firm* — Schmeiser, Olsen & Watts; Brian M. Restauro

(57) ABSTRACT

A method and system for improving real-time digital media capture and presentation is provided. The method includes retrieving digital media content in real time and dividing the digital media content into groups each including similar digital media portions. A digital tag is assigned to each group and each digital tag digitally describes media elements within each portion of the similar digital media portions. Each portion is analyzed with respect to the media elements and associated metadata is generated. The metadata is assigned to each media element and the groups of similar digital media portions are configured for automated presentation for users.

20 Claims, 10 Drawing Sheets

(51) Int. Cl.
*H04N 21/442* (2011.01)
*H04N 21/422* (2011.01)
*G06F 8/60* (2018.01)

(56) References Cited

U.S. PATENT DOCUMENTS

| | | | | |
|---|---|---|---|---|
| 5,872,575 | A * | 2/1999 | Segal | G06T 15/00 345/473 |
| 6,065,042 | A * | 5/2000 | Reimer | G11B 27/034 709/203 |
| 6,097,393 | A * | 8/2000 | Prouty, IV | G06F 3/04815 345/419 |
| 6,282,713 | B1 * | 8/2001 | Kitsukawa | G06Q 30/02 348/E5.105 |
| 6,409,602 | B1 * | 6/2002 | Wiltshire | A63F 3/081 463/16 |
| 6,509,910 | B1 | 1/2003 | Agarwal | |
| 6,535,228 | B1 | 3/2003 | Bandaru | |
| 6,658,662 | B1 * | 12/2003 | Nielsen | H04N 7/16 348/E7.054 |
| 7,000,242 | B1 * | 2/2006 | Haber | G06Q 30/02 725/43 |
| 7,054,831 | B2 * | 5/2006 | Koenig | G06Q 30/02 463/1 |
| 7,162,197 | B2 * | 1/2007 | Kitamura | A63H 33/38 434/317 |
| 7,715,642 | B1 * | 5/2010 | Collins | G06T 13/00 345/629 |
| 8,043,156 | B2 * | 10/2011 | Ackley | A63F 13/12 463/23 |
| 8,079,054 | B1 * | 12/2011 | Dhawan | G06Q 30/00 725/105 |
| 8,221,220 | B2 * | 7/2012 | Ackley | A63F 13/332 463/23 |
| 8,910,201 | B1 * | 12/2014 | Zamiska | H04N 21/44222 725/34 |
| 9,462,340 | B1 * | 10/2016 | Mathurin | H04N 21/234336 |
| 9,472,166 | B2 | 10/2016 | Frieder | |
| 9,516,373 | B1 * | 12/2016 | Abecassis | H04N 21/4307 |
| 9,596,502 | B1 * | 3/2017 | Abecassis | H04N 21/84 |
| 9,817,625 | B1 | 11/2017 | Chun | |
| 2001/0001160 | A1 * | 5/2001 | Shoff | H04N 5/44543 725/51 |
| 2001/0037303 | A1 * | 11/2001 | Mizrahi | G06Q 20/123 705/52 |
| 2001/0039571 | A1 * | 11/2001 | Atkinson | G06Q 30/02 709/217 |
| 2002/0033844 | A1 * | 3/2002 | Levy | G06F 21/10 715/744 |
| 2002/0052746 | A1 * | 5/2002 | Handelman | H04N 7/163 704/270 |
| 2002/0069405 | A1 * | 6/2002 | Chapin | H04N 7/162 725/32 |
| 2002/0133562 | A1 * | 9/2002 | Newnam | G06Q 30/02 709/216 |
| 2002/0162117 | A1 * | 10/2002 | Pearson | H04N 5/445 725/109 |
| 2003/0056212 | A1 * | 3/2003 | Siegel | H04N 5/913 725/31 |
| 2003/0149618 | A1 * | 8/2003 | Sender | G06Q 30/02 705/14.55 |
| 2003/0149975 | A1 * | 8/2003 | Eldering | H04N 7/17318 725/34 |
| 2003/0217210 | A1 * | 11/2003 | Carau, Sr. | G06F 1/26 710/302 |
| 2004/0068536 | A1 * | 4/2004 | Demers | H04L 29/06027 709/201 |
| 2004/0073493 | A1 * | 4/2004 | Kato | G06Q 30/02 705/500 |
| 2004/0205582 | A1 | 10/2004 | Schiller | |
| 2004/0255322 | A1 * | 12/2004 | Meadows | H04N 7/17309 725/23 |
| 2005/0066352 | A1 * | 3/2005 | Herley | H04N 7/16 725/19 |
| 2005/0132398 | A1 * | 6/2005 | Baran | G06Q 30/02 725/28 |
| 2005/0144024 | A1 * | 6/2005 | Wojton | G06Q 10/10 705/319 |
| 2005/0267813 | A1 * | 12/2005 | Monday | G06Q 30/02 705/26.1 |
| 2006/0123451 | A1 * | 6/2006 | Preisman | H04N 7/17318 725/86 |
| 2006/0184579 | A1 * | 8/2006 | Mills | H04N 7/173 |
| 2006/0291483 | A1 * | 12/2006 | Sela | H04L 12/66 370/401 |
| 2007/0271580 | A1 * | 11/2007 | Tischer | H04H 60/07 725/35 |
| 2008/0015864 | A1 * | 1/2008 | Ross | G10L 15/1822 704/275 |
| 2008/0089659 | A1 * | 4/2008 | Clapper | H04N 21/858 386/353 |
| 2008/0115161 | A1 * | 5/2008 | Kurzion | G06Q 30/02 725/32 |
| 2008/0115655 | A1 * | 5/2008 | Weng | G10H 1/0008 84/609 |
| 2008/0187279 | A1 * | 8/2008 | Gilley | G06Q 30/02 386/250 |
| 2008/0221986 | A1 * | 9/2008 | Soicher | G06Q 30/02 705/14.36 |
| 2008/0282283 | A1 * | 11/2008 | Hilton | G06Q 20/12 725/5 |
| 2008/0285940 | A1 * | 11/2008 | Kulas | G11B 27/3027 386/248 |
| 2008/0295129 | A1 * | 11/2008 | Laut | H04N 21/812 725/34 |
| 2009/0094632 | A1 * | 4/2009 | Newnam | H04N 7/17318 725/24 |
| 2009/0217316 | A1 * | 8/2009 | Gupta | G06Q 30/0269 725/32 |
| 2009/0281908 | A1 * | 11/2009 | Wong | G11B 27/034 705/26.1 |
| 2009/0293081 | A1 * | 11/2009 | Pirani | H04N 7/17318 725/25 |
| 2009/0299752 | A1 * | 12/2009 | Rodriguez | D06F 58/28 704/275 |
| 2010/0131385 | A1 * | 5/2010 | Harrang | G06Q 30/00 705/26.1 |
| 2010/0256561 | A1 * | 10/2010 | Gillespie, Jr. | A61M 5/142 604/151 |
| 2010/0283741 | A1 * | 11/2010 | Heintze | G06F 3/0238 345/173 |
| 2010/0332570 | A1 * | 12/2010 | Roberts | H04N 21/252 707/912 |
| 2011/0137753 | A1 * | 6/2011 | Moehrle | H04N 21/2547 705/27.1 |
| 2011/0138326 | A1 * | 6/2011 | Roberts | G06Q 30/02 715/808 |
| 2011/0167456 | A1 * | 7/2011 | Kokenos | H04N 21/812 725/60 |
| 2011/0276334 | A1 * | 11/2011 | Wang | G10L 25/48 704/270 |
| 2011/0289536 | A1 * | 11/2011 | Poder | H04H 60/97 725/95 |
| 2011/0310580 | A1 * | 12/2011 | Leung | G06F 1/1618 361/807 |
| 2012/0016678 | A1 * | 1/2012 | Gruber | G10L 13/02 704/275 |
| 2012/0084811 | A1 * | 4/2012 | Thompson | H04N 21/44222 725/34 |
| 2012/0084812 | A1 * | 4/2012 | Thompson | H04N 21/25891 725/34 |
| 2012/0096369 | A1 | 4/2012 | Nudd | |
| 2012/0110620 | A1 * | 5/2012 | Kilar | G06Q 30/02 725/34 |
| 2013/0304795 | A1 * | 11/2013 | Kang | H04L 67/10 709/202 |
| 2014/0109161 | A1 * | 4/2014 | Chang | H04M 1/72527 725/110 |

(56) References Cited

U.S. PATENT DOCUMENTS

| | | | |
|---|---|---|---|
| 2014/0250477 A1* | 9/2014 | Kang | H04N 21/4334 725/110 |
| 2014/0278834 A1* | 9/2014 | Lautz | G06Q 30/0203 705/12 |
| 2014/0359453 A1 | 12/2014 | Palfreeman | |
| 2016/0077573 A1* | 3/2016 | Lee | H04L 12/12 713/310 |

OTHER PUBLICATIONS

"Nixplay and Seed Frames", Nixplay Seed—Cloud Based Wi-Fi Digital Photo Frames, accessed on Apr. 24, 2018 3:39 PM, pp. 1-8, <https://www.nixplay.com/seed-frames/>.

Augenstein, N., "Social Photo Frame: From Phone to Grandparents Instantly", WTOP, Apr. 21, 2014 11:01 am, pp. 5-8, <https://wtop.com/news/2014/04/social-photo-frame-from-phone-to-grandparents-instantly/slide/1/>.

Herrick, J., "Famatic Tries Tapping Into the Senior Market With a Cloud-Connected Photo Viewer", Backer Jack, Apr. 24, 2014, accessed Apr. 24, 2014, pp. 1-5, <http://backerjack.com/famatic-tries-tapping-into-the-senior-market-with-a-cloud-connected-photo-viewer/>.

Lilly, P., "The digital picture frame refuses to die (and here's one that wants to hatch)", Tech Hive, Feb. 19, 2015 4:51 PM PT, pp. 1-4, <https://www.techhive.com/article/2886799/smart-appliance/the-digital-picture-frame-refuses-to-die-and-heres-one-that-wants-to-hatch.html>.

Smith, A., "Older Adults and Technology Use", Pew Research Center, Apr. 3, 2014, pp. 1-3, <http://www.pewinternet.org/2014/04/03/older-adults-and-technology-use/>.

Zargham et al., "4STREAMS: An Ambient Photo Sharing Application for Extended Families", British HCI 2015, Jul. 13-17, 2015, Lincoln, United Kingdom, © 2015 ACM, pp. 165-174.

* cited by examiner

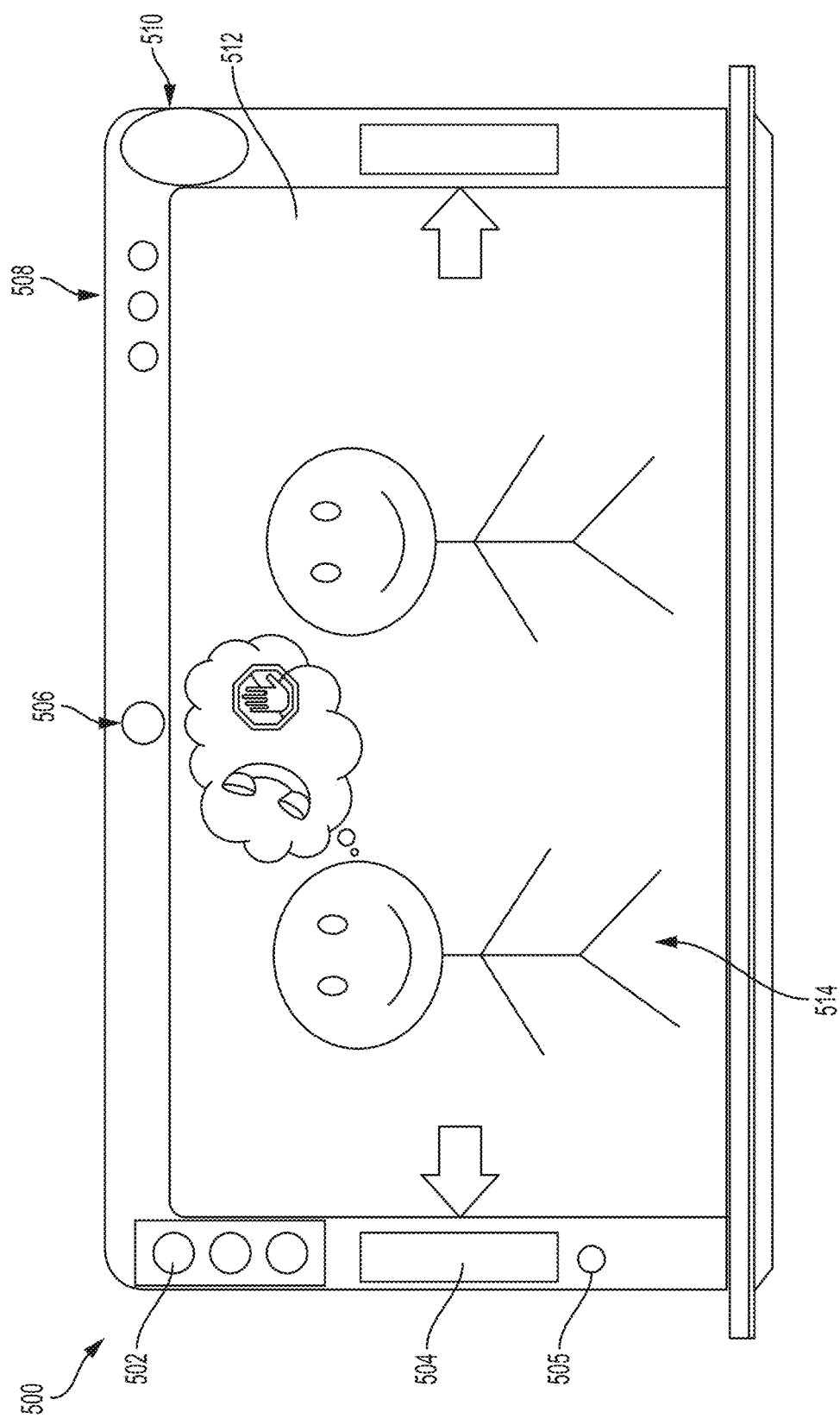

| USER 1 PHOTOS | USER 1 PHOTOS WITH ADDED COMMENTS | SYSTEM IDENTIFIED ELEMENTS IN THE PHOTOS |
|---|---|---|
| PHOTO 1<br><br>Headline Writing And Title Tag SEO in a Clickbait world<br>Clickbait vs. Search-Optimized?<br>It's about searcher intent and website/rank<br>Clickbait pieces that will resonate on social media<br>Intent Of Searchers<br>Your Marketing Goals<br>This intersection is a Difficult target to hit!<br><br>Viking Battles<br>Battles Involving The Vikings<br>The 7 Most Relevant Last Stands In The History Of Battles<br>Viking Jewelry<br>Viking Jewelry - Sterling Silver | "Planning session at the office 09/19/2016" ← 602a | [Object] Whiteboard<br>[Place] Work<br>[Object] Diagrams<br>[Situation] Private<br>[Situation] Planning ← 602b |
| PHOTO 2 ← 604 | "Family vacation at XYZ beach"<br>"Guys are happy on the beach" ← 604a | [Place] Beach<br>[People] Family<br>[People] John<br>[People] Marie (John's wife) ← 604b |

FIG. 6A

REAL TIME DIGITAL MEDIA CAPTURE AND PRESENTATION

FIELD

The present invention relates generally to a method for capturing and presenting digital media and in particular to a method and associated system for improving network media technology by automatically retrieving digital media content and configuring portions of the digital media content for automated network transmission and presentation.

BACKGROUND

Typical social network content sharing systems allow for little flexibility with respect to ease of usage. Automatically sharing network content may include a complicated process that may be time consuming and require a large amount of resources. Additionally, sharing network content between users may require technically advanced users for enabling automated functionality.

SUMMARY

A first aspect of the invention provides a method comprising: retrieving in real time, by a processor of a hardware device in response to a user command, digital media content; dividing, by the processor, the digital media content into groups each comprising similar digital media portions of the digital media content; assigning, by the processor, a digital tag to each group of the groups, wherein each digital tag digitally describes media elements within each portion of the similar digital media portions; analyzing, by the processor, each the portion with respect to the media elements; generating, by the processor based on results of the analyzing, metadata describing each media element of the media elements; assigning, by the processor, the metadata to each media element; and configuring, by the processor in response to user instructions and the metadata, the groups of the similar digital media portions of the digital media content for automated presentation for a plurality of users thereby improving real-time digital media capture and presentation.

A second aspect of the invention provides a computer program product, comprising a computer readable hardware storage device storing a computer readable program code, the computer readable program code comprising an algorithm that when executed by a processor of a hardware device implements a method, the method comprising: retrieving in real time, by the processor in response to a user command, digital media content; dividing, by the processor, the digital media content into groups each comprising similar digital media portions of the digital media content; assigning, by the processor, a digital tag to each group of the groups, wherein each digital tag digitally describes media elements within each portion of the similar digital media portions; analyzing, by the processor, each the portion with respect to the media elements; generating, by the processor based on results of the analyzing, metadata describing each media element of the media elements; assigning, by the processor, the metadata to each media element; and configuring, by the processor in response to user instructions and the metadata, the groups of the similar digital media portions of the digital media content for automated presentation for a plurality of users thereby improving real-time digital media capture and presentation.

A third aspect of the invention provides a hardware device comprising a processor coupled to a computer-readable memory unit, the memory unit comprising instructions that when executed by the computer processor implements a method comprising: retrieving in real time, by the processor in response to a user command, digital media content; dividing, by the processor, the digital media content into groups each comprising similar digital media portions of the digital media content; assigning, by the processor, a digital tag to each group of the groups, wherein each digital tag digitally describes media elements within each portion of the similar digital media portions; analyzing, by the processor, each the portion with respect to the media elements; generating, by the processor based on results of the analyzing, metadata describing each media element of the media elements; assigning, by the processor, the metadata to each media element; and configuring, by the processor in response to user instructions and the metadata, the groups of the similar digital media portions of the digital media content for automated presentation for a plurality of users thereby improving real-time digital media capture and presentation. The present invention advantageously provides a simple method and associated system capable of providing automated network content sharing.

BRIEF DESCRIPTION OF THE DRAWINGS

FIG. 5 illustrates a schematic diagram of a digital picture frame for automatically displaying pictures shared on social media without the need to learn a specified social media platform, in accordance with embodiments of the present invention.

FIG. 6, including FIG. 6A and FIG. 6B, illustrates an implementation example describing an analysis process for automatically assigning photographs shared on social media with specified users without the need to learn a specified social media platform, in accordance with embodiments of the present invention.

DETAILED DESCRIPTION

Figure 1:
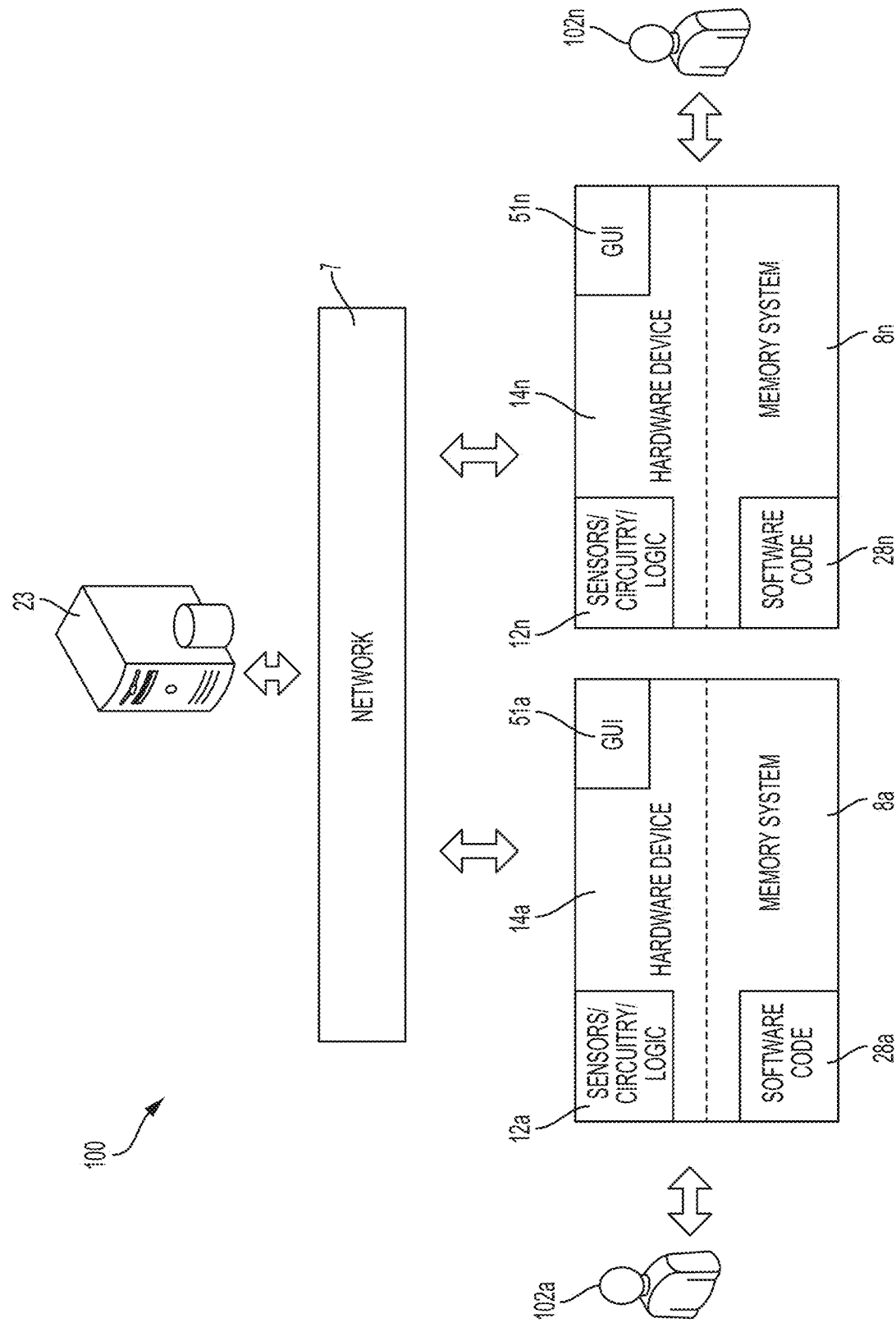
FIG. 1 illustrates a system for improving network media technology by automatically retrieving digital media content and configuring portions of the digital media content for automated network transmission and presentation, in accordance with embodiments of the present invention.

FIG. 1 illustrates a system 100 for improving network media technology by automatically retrieving digital media content and configuring portions of the digital media content for automated network transmission and presentation, in accordance with embodiments of the present invention. Typical media sharing systems do not allow automated functionality with respect to sharing specific media files with specified users. The ability to automatically provide media files for specified users provides significant benefits for members of user groups. Therefore, system 100 enables a process for configuring groups of said similar digital media portions of digital media content for automated presentation for a plurality of discrete users thereby improving real-time digital media capture and presentation processes with respect to individual users.

System 100 is configured to enable a cloud-based service content delivery system that generates details with respect to delivering video data, shared via social media sources, to one or more trusted display-based hardware devices. System 100 is enabled to retrieve live social video streams and intelligently categorize and live stream pictures of the video stream with respect to differing ambient platforms such as, inter alfa, picture frames. System 100 is configured for stipulating specified pictures from social media sources to be applied to specified picture frames. The stipulation may be based on a relationship pattern, a process for learning from historic data, etc. For example, a user (John) purchased two cognitive digital photo frames. He gives a first frame to his mother and a second frame to his friend Bob. Subsequently, John configures his mother's frame with digital tags describing digital tags for "family", "distinguished", and "Happy" and he configures Bob's frame with digital tags describing "friends", "party", and "celebration". During the week John uploads several photos and system 100 analyzes the photos and determines associated digital tags for intelligently sharing the photos. Therefore, system 100 comprises a feedback system for allowing system 100 to generate self-learning code based on user experience for better predicting which pictures to send to the frame users in the future. Feedback may be provided via a like button on the picture frame or via gaze detection and interpretation (e.g. happy or emotional facial expressions that imply the user's satisfaction level). A visual coefficient may be added to the pictures.

System 100 of FIG. 1 includes a server hardware device 23 connected through a network 7 to hardware devices 14a. . . 14n associated with users 102a. . . 102n. Hardware device 14a comprises sensors/circuitry/logic 12a, a graphical user interface (GUI) 51a, and a (specialized) memory system 8a. Memory system 8a comprises (self-learning) software code 28a. Memory system 8a may include a single memory system. Alternatively, memory system 8a may include a plurality of memory systems. Hardware device 14n comprises sensors/circuitry/logic 12n, a GUI 51n, and a (specialized) memory system 8n. Memory system 8n comprises software code 28n. Memory system 8n may include a single memory system. Alternatively, memory system 8n may include a plurality of memory systems. Server hardware device 23 and hardware devices 14a. . . 14n each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware device 23 and hardware devices 14a. . . 14n may each comprise a specialized hardware device comprising specialized (non-generic) hardware and circuitry (i.e., specialized discrete non-generic analog, digital, and logic based circuitry) for (independently or in combination) executing a process described with respect to FIGS. 1-9. The specialized discrete non-generic analog, digital, and logic based circuitry (e.g., sensors/circuitry/logic 12a. . . 12n, etc.) may include proprietary specially designed components (e.g., a specialized integrated circuit, such as for example an Application Specific Integrated Circuit (ASIC) designed for only implementing an automated process for improving network media technology by automatically retrieving digital media content and configuring portions of the digital media content for automated network transmission and presentation. Sensors/circuitry/logic 12a. . . 12n may include any type of internal or external sensors including, inter alia, GPS sensors, social network code based sensors, environmental sensors, biometric sensors, voltage sensors, network traffic sensors, temperature sensors, audio/video retrieval devices, heartrate sensors, ultrasonic sensors, pressure sensors, light/optical sensors, brood pressure sensors, weather sensors, etc. Hardware devices 14a. . . 14n may include, inter alia, digital picture frames, smart TVs, IOT devices, smart watches, computers, smart phones, etc. Network 7 may include any type of network including, inter alia, a local area network, (LAN), a wide area network (WAN), the Internet, a wireless network, etc.

System 100 enables a cognitive digital media display apparatus for allowing secure access to the pictures (or any visual digital media) posted (to a social network) by close friends and family via differing social networking platforms without the need for the user to learn the differing social network platforms. System 100 executes a process for selectively and intelligently delivering media files (e.g., video) shared by users (in their social networks) to ambient displays (e.g., photo frames) based on user configurations with respect to associated digital picture frames. The configurations may include selections for identifying people, emotions, situations, objects, etc. Alternatively, system 100 executes a process for matching identified elements within media files with specified user configurations associated with picture frames such that elements identification is determined based on: objects, people, situations, and emotions that are detected in the media files or comments, tags, and reactions to the original media file. System 100 allows for a smart and secure selection of digital video media for display within digital photo frame in accordance with: user wishes; digital tags socially posted onto a media site; intelligent recognition of elements within photos with respect to associated digital tags; and machine learned preferences based on cognitive feedback (e.g., analytics describing frame owner reactions and comments over displayed media files) to intelligently recommend user tags for allowing users to auto assign the digital video media.

System 100 executes a computer-implemented process for sharing digital media that includes:

1. Identifying an element of the digital media received as a member of a predetermined set of categories of elements.

2. Analyzing a predetermined set of categories of elements to selectively determine an identified element of the digital media data as a candidate for multiple specified ambient platforms. The analysis uses information including, inter alia, a relationship pattern, a set of digital tags, a set of comments, historical data, etc.
3. Transmitting an identified element of the digital media data as a candidate to the multiple specified ambient platforms.
4. Updating the information (e.g., a relationship pattern, a set of tags, a set of comments, historical data) with user experience data from the multiple specified ambient platforms to use with a next iteration of the identifying and the analyzing steps.

Figure 2:
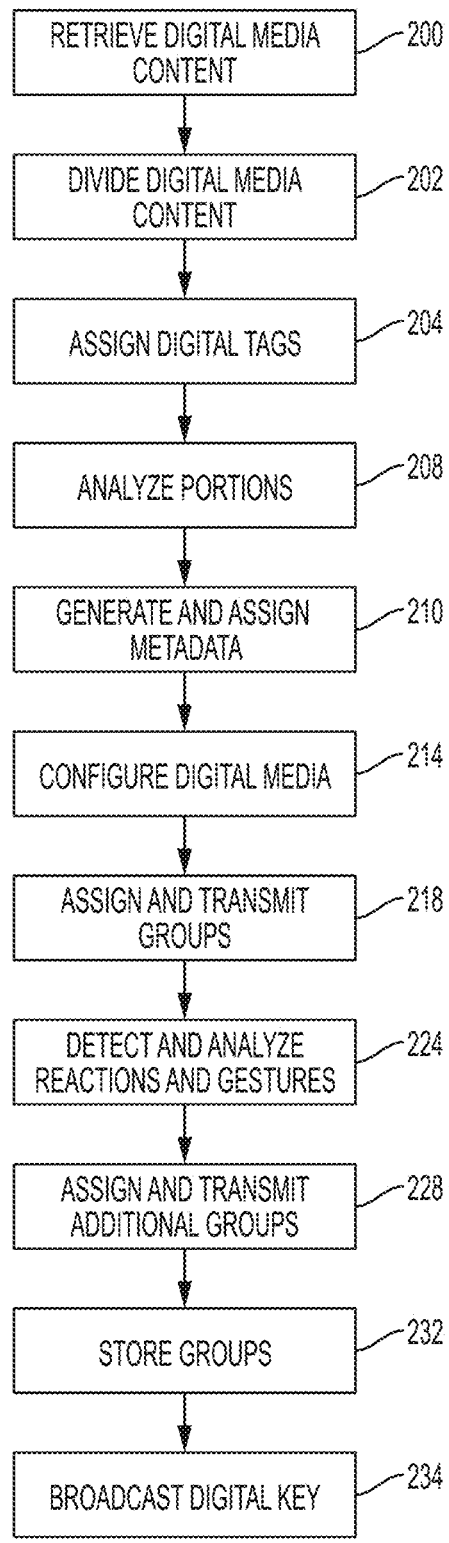
FIG. 2 illustrates an algorithm detailing a process flow enabled by the system of FIG. 1 for improving network media technology by automatically retrieving digital media content and configuring portions of the digital media content for automated network transmission and presentation, in accordance with embodiments of the present invention.

FIG. 2 illustrates an algorithm detailing a process flow enabled by system 100 of FIG. 1 for improving network media technology by automatically retrieving digital media content and configuring portions of the digital media content for automated network transmission and presentation, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server hardware device 23 and hardware devices 14a . . . 14n of FIG. 1. In step 200, digital media content is retrieved in real time. In step 202, the digital media content is divided into groups each comprising similar digital media portions of the digital media content. Dividing the digital media content may include an actual step for splitting up the digital media content. Alternatively, dividing the digital media content may include classifying or categorizing the digital media content. In step 204, a digital tag is assigned to each group such that each digital tag digitally describes media elements within each portion of the similar digital media portions. In step 208, each portion (of the similar digital media portions) is analyzed with respect to the media elements. In step 210, metadata describing each media element is generated based on results of step 208. The metadata is assigned to each said media element. In step 214, the groups of similar digital media portions of the digital media content are configured for automated presentation (e.g., via a digital picture frame, an Internet connected television set, a computer system comprising a GUI, etc.) for a plurality of users thereby improving real-time digital media capture and presentation. In step 218, a first group of similar digital media portions is assigned and transmitted to a first user resulting in an automated presentation of the first group for the first user. In step 224, user reactions and associated gestures of the first user are detected (via a plurality of sensor devices) and analyzed in response to the automated presentation. Detecting the user reactions and associated gestures may include:
1. Detecting (via biometric sensors) biometric data associated with the first user. The biometric data may include, inter alfa, a current respiration rate of user, a current body temperature of the user, a current perspiration rate of the user, a current heartrate of the user, etc.
2. Retrieving (via an audio and video retrieval device) audio and video data associated with the first user.
3. Analyzing the audio/video and biometric data.
4. Determining (based on the analysis) a current physiological state of the first user.
5. Comparing the current physiological state to a baseline physiological state of the first user.
6. Determining that the current physiological state comprises a positive physiological state of the first user.
7. Generating self-learning software code for executing said configuring and the automated presentation.

In step 228, additional groups of the similar digital media portions are assigned to the first user in response to the analysis of step 224. The additional groups are automatically transmitted to the first user resulting in an additional automated presentation of the additional groups for the first user. In step 232, each group comprising similar digital media portions of the digital media content is stored within an associated specialized portion of a specialized memory device. In step 234, a digital authorization key is broadcast such that the automated presentation of step 214 is performed in response to an authorization process executed via the digital authorization key.

Figure 3A:
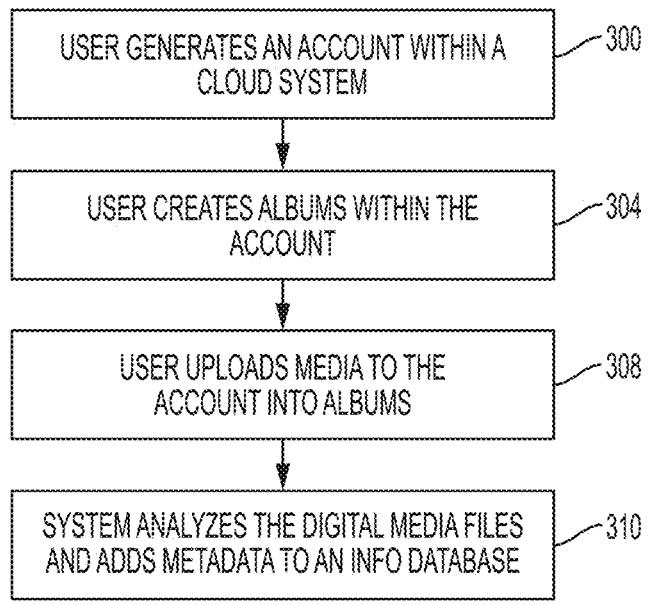
FIG. 3A illustrates an algorithm detailing a process flow enabled by the system of FIG. 1 for generating an account and analyzing digital media files, in accordance with embodiments of the present invention.

FIG. 3A illustrates an algorithm detailing a process flow enabled by system 100 of FIG. 1 for generating an account and analyzing digital media files, in accordance with embodiments of the present invention. In step 300, a user generates an account within a cloud system. In step 304, the user generates digital media albums within the account. In step 308, the user uploads digital media files to the digital media albums. Alternatively, the user may add digital tags (e.g., associated with people, places or titles within a photo of the digital media) to the digital media files so that specified digital media files may be automatically uploaded. In step 310, the digital media files are analyzed for media elements such as general sentiment, identified elements or people within the digital files, etc. Additionally, metadata associated with the media elements is added to an associated database.

Figure 3B:
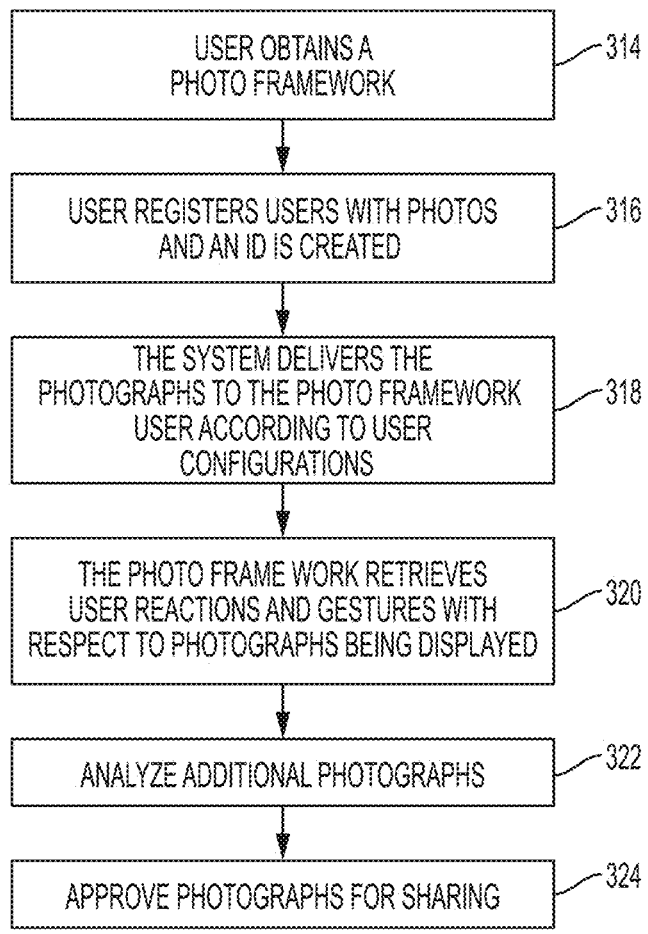
FIG. 3B illustrates an algorithm detailing an implementation example enabled by the system of FIG. 1 for automatically delivering digital media files, in accordance with embodiments of the present invention.

FIG. 3B illustrates an algorithm detailing an implementation example enabled by system 100 of FIG. 1 for automatically delivering digital media files, in accordance with embodiments of the present invention. In step 314, a user obtains a photo framework. In step 316, the user registers users for access to photographs (i.e., digital media files) and an identification tag is generated for each of the users. The identification tags are associated with the account in the cloud system described with respect to FIG. 3A. Subsequently, the photo framework is configured for the users with respect to media albums selected by the user. In step 318, the system delivers (i.e., uploads) the photographs to the photo framework according to user configurations. In step 320, the photo framework retrieves user reactions and gestures (via sensors) with respect to the photographs being displayed and updates an associated cloud system storing the photographs. In step 324, additional (unshared) photographs are analyzed with respect to the photographs being displayed and receiving positive feedback with respect to the retrieved user reactions and gestures. The additional photographs are recommended for sharing with additional parties. Likewise, the additional photographs are tagged with respect to media elements within the photographs. In step 328, the additional photographs are approved for sharing and are shared with the additional parties. Additionally, a reaction detection system may be enabled such that a graphical user interface (GUI) display collects feedback data regarding the additional photographs and over time, the reaction detection system analyzes the photographs to determine user preferences and displays only qualifying photographs. The feedback data may be collected via various means. For example, user actions (e.g., clicking a button to go back to a specific picture) may be retrieved. Alternatively, a rating system may be implemented. Additionally, the images may be associated with background music that complements the pictures being displayed.

Figure 4:
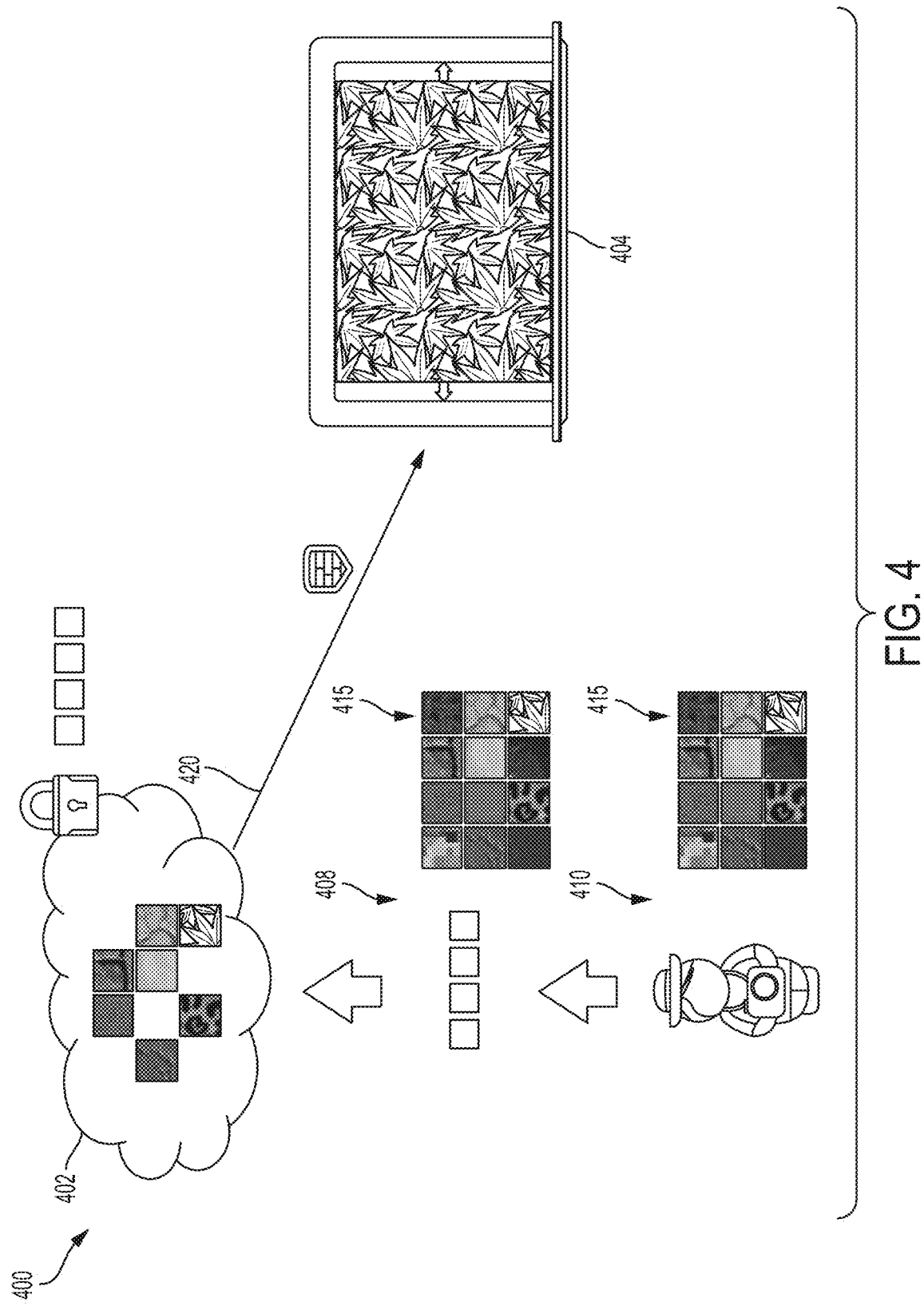
FIG. 4 illustrates an overall schematic diagram associated with a system comprising a digital picture frame for automatically displaying pictures shared on social media without the need to learn a specified social media platform, in accordance with embodiments of the present invention.

FIG. 4 illustrates an overall schematic diagram 400 associated with a system comprising a digital picture frame for automatically displaying pictures shared on social media without the need to learn a specified social media platform, in accordance with embodiments of the present invention. The schematic diagram 400 illustrates a user 410 taking photographs 415, uploading the photographs 415 to a social media Website, and tagging the photographs 415 with digital tags 408 for enabling sharing with a private network or social media Website. The photographs 415 and associated digital tags 408 are converted into a photo stream 402 and transmitted via a secure network connection 420 to a digital picture frame 404 associated with a trusted user for automated viewing.

FIG. 5 illustrates a schematic diagram of a digital picture frame 500 for automatically displaying pictures shared on social media without the need to learn a specified social media platform, in accordance with embodiments of the present invention. The digital picture frame 500 comprises a power switch 502, a speaker 504, a microphone 505, a camera 506, sensors 508 (e.g., a motion detector, a light sensor, a gravity sensor, etc.), a fingerprint detector 510, and a display portion 512. Digital picture frame 500 comprises an authentication mechanism for enabling a user to configure digital picture frame 500 using a specialized software application. The user configures digital picture frame 500 such that the user is able to log into one or more of her/his social networks. Additionally, digital picture frame 500 is configured to receive media elements related to associated digital tags. Likewise, another user may configure digital picture frame 500 such that differing photos are received from different people of interest. When digital picture frame 500 integrated with a social network account, access is enabled such that the frame owner may write comments reflected in the social network source for the photo.

The following examples illustrate alternative embodiments with respect to digital picture frame 500 of FIG. 5 for assigning specified video media to specified users.
1. A channel enabled via a smart TV may be pre-configured to only display current photos uploaded to a social media private section with easy to follow navigation options.
2. A flip-able digital photo album comprising paper thin electronic screens may be implemented as a photo feed from a single user. For example, a first page may illustrate a photo feed from a first user's social media account and a second page may illustrate a photo feed from a second user's social media account.
3. A cognitive picture frame may be enabled to filter out and display only photos determined to be acceptable by an owner of the cognitive picture frame.
4. Touching the person's photo in a photo frame may optionally enable a user to execute a phone call with the person.
5. An authentication process associated with an ID for the frame may be executed as follows: A first user purchases a digital frame for a family member and a unique public private key pair is generated with MAC ID for the frame and a finger print of the first user. In response, the public key is broadcast and a secure connection is established with any user attempting to transmit video media. When a secure connection is established, the video media may be sent by the first user (or downloaded by the digital frame). Additionally, the first user must re-authenticate his/her credentials: after specified time duration, if the digital frame is disconnected from a network, if the digital frame is disconnected from a physical location, etc. For example, a re-authentication mechanism may comprise usage of a fingerprint reader on the digital frame.

Figure 6B:
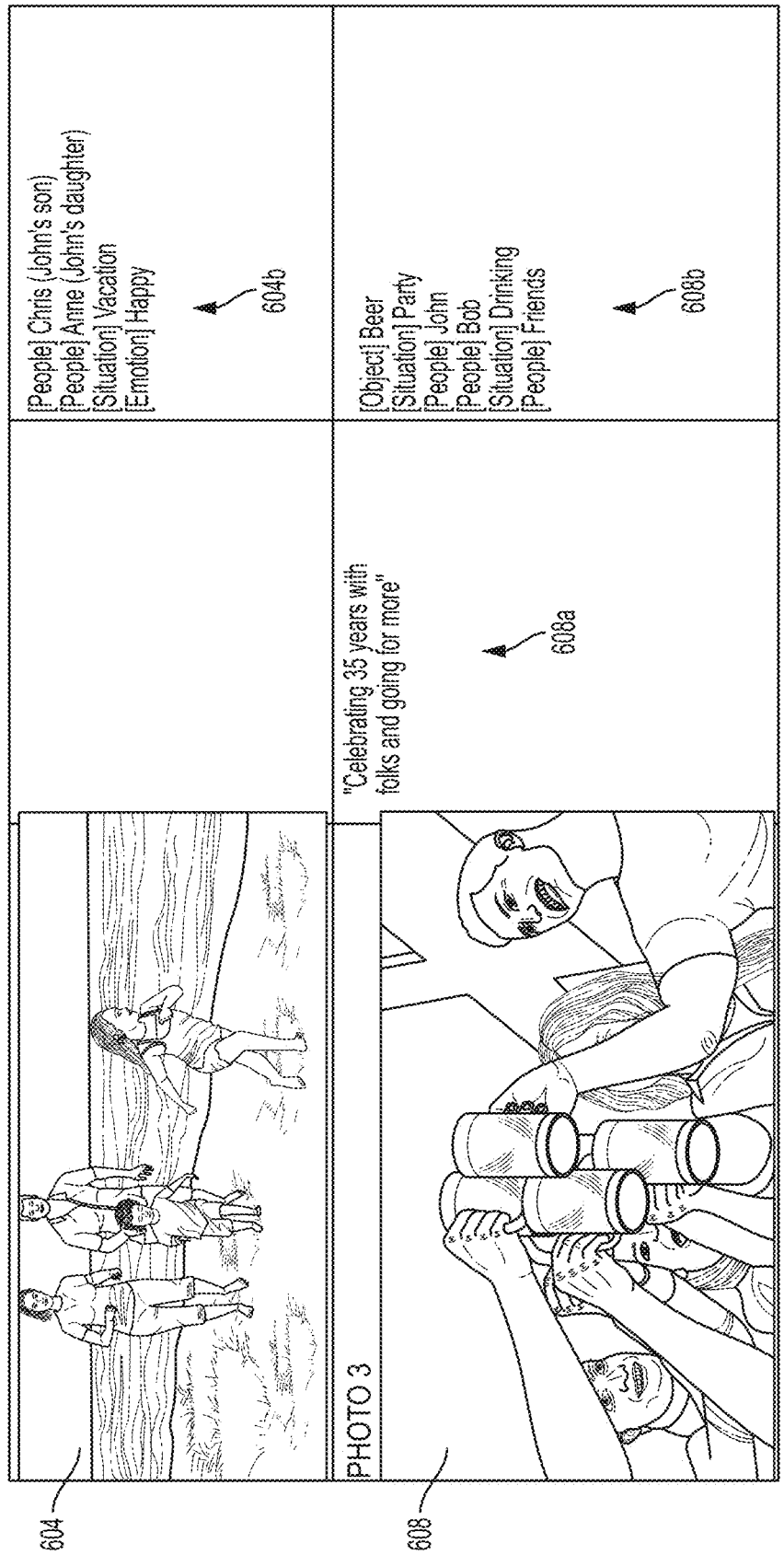

FIG. 6, including FIG. 6A and FIG 6B, illustrates an implementation example describing an analysis process for automatically assigning photographs shared on social media with specified users without the need to learn a specified social media platform, in accordance with embodiments of the present invention. The implementation example presented in FIG. 6A and FIG. 6B illustrates processing for user photographs such as: a photograph 602, a photograph 604, and a photograph 608. The processing includes added comments 602a, 604a, and 608a and identified photographic elements 602b, 604b, and 608b. Added comments 602a, 604a, and 608a and identified photographic elements 602b, 604b, and 608b are used for identifying and allocating photograph 602, photograph 604, and photograph 608 for automated social network transmission and presentation.

Figure 7:
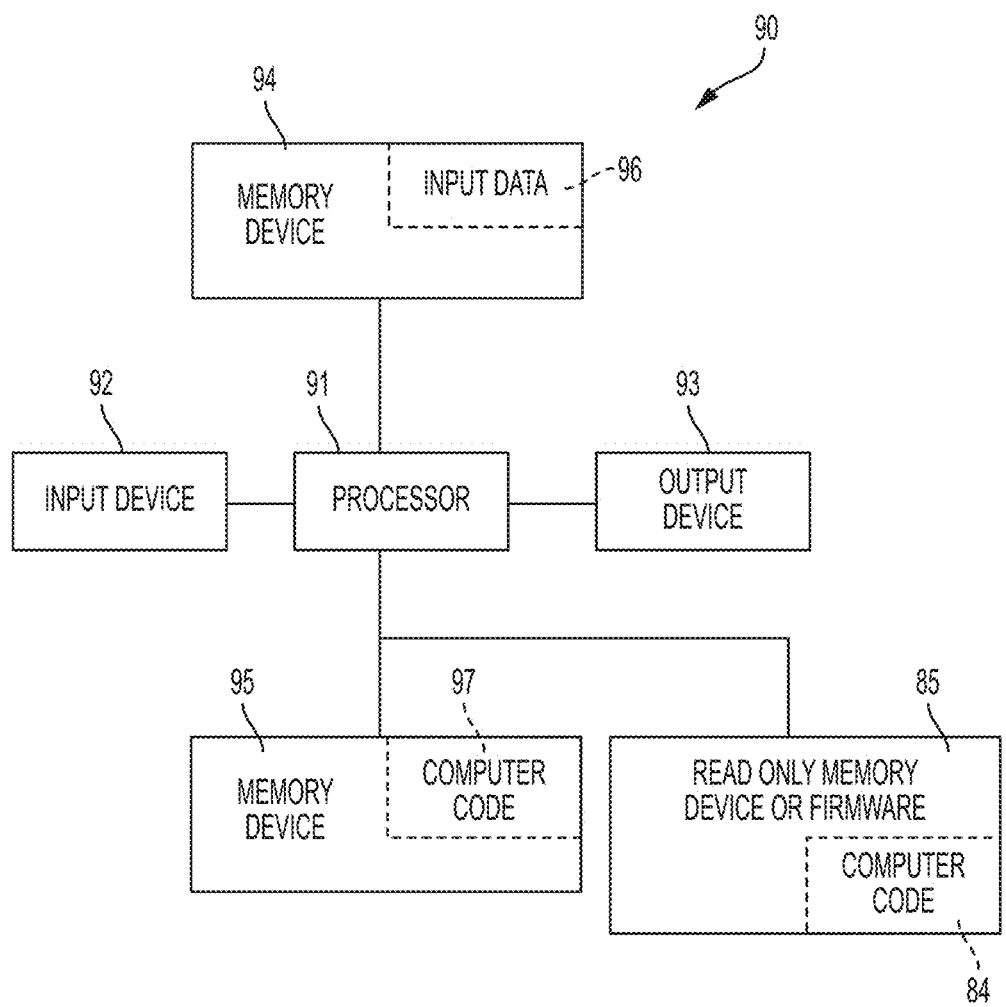
FIG. 7 illustrates a computer system used by the system of FIG. 1 for improving network media technology by automatically retrieving digital media content and configuring portions of the digital media content for automated network transmission and presentation, in accordance with embodiments of the present invention.

FIG. 7 illustrates a computer system 90 (e.g., server hardware device 23 and hardware devices 14a... 14n of FIG. 1) used by or comprised by the system of FIG. 1 for improving network media technology by automatically retrieving digital media content and configuring portions of the digital media content for automated network transmission and presentation, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 7 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-3B) for improving network media technology by automatically retrieving digital media content and configuring portions of the digital media content for automated network transmission and presentation. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 85) may include algorithms (e.g., the algorithms of FIGS. 2-3B) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve network media technology by automatically retrieving digital media content and configuring portions of the digital media content for automated network transmission and presentation. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving network media technology by automatically retrieving digital media content and configuring portions of the digital media content for automated network transmission and presentation. In another embodiment, the invention provides a business method that performs the process steps of the invention on a subscription, advertising, and/or fee basis. That is, a service supplier, such as a Solution Integrator, could offer to enable a process for improving network media technology by automatically retrieving digital media content and configuring portions of the digital media content for automated network transmission and presentation. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
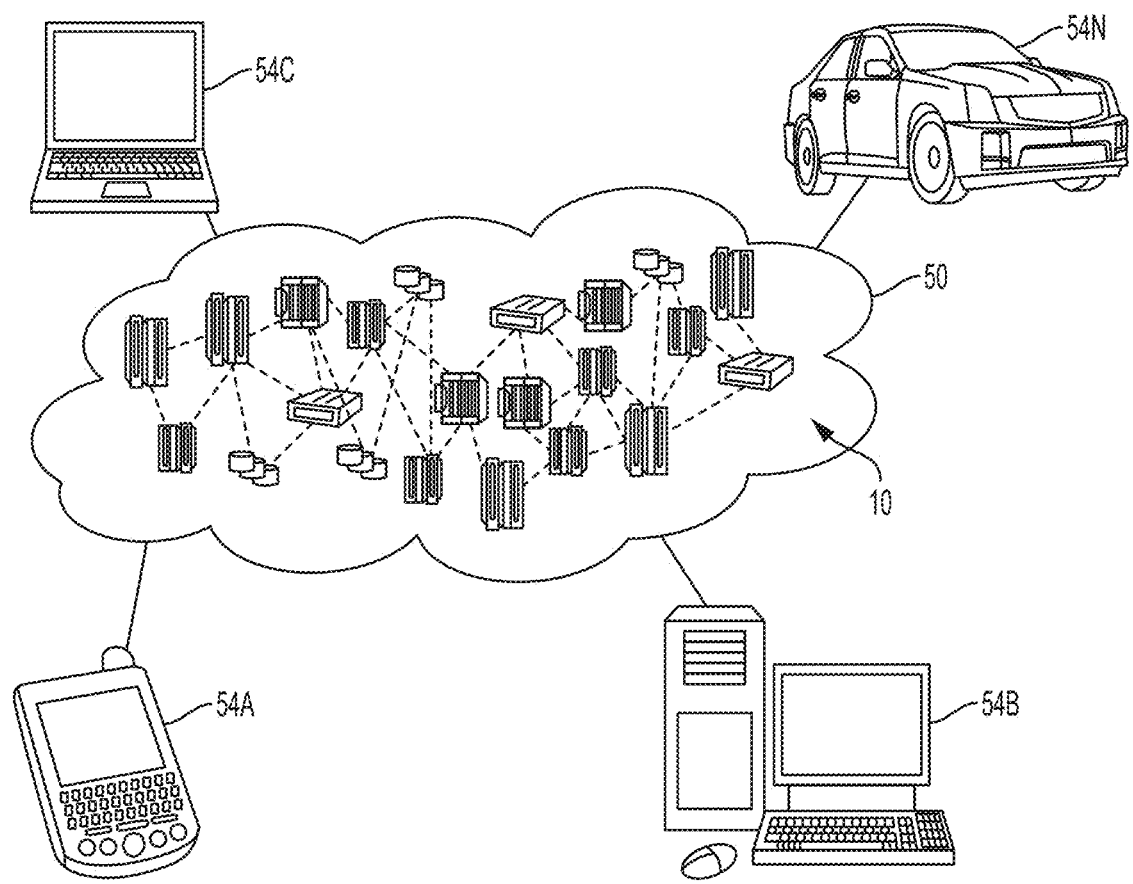
FIG. 8 illustrates a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 9:
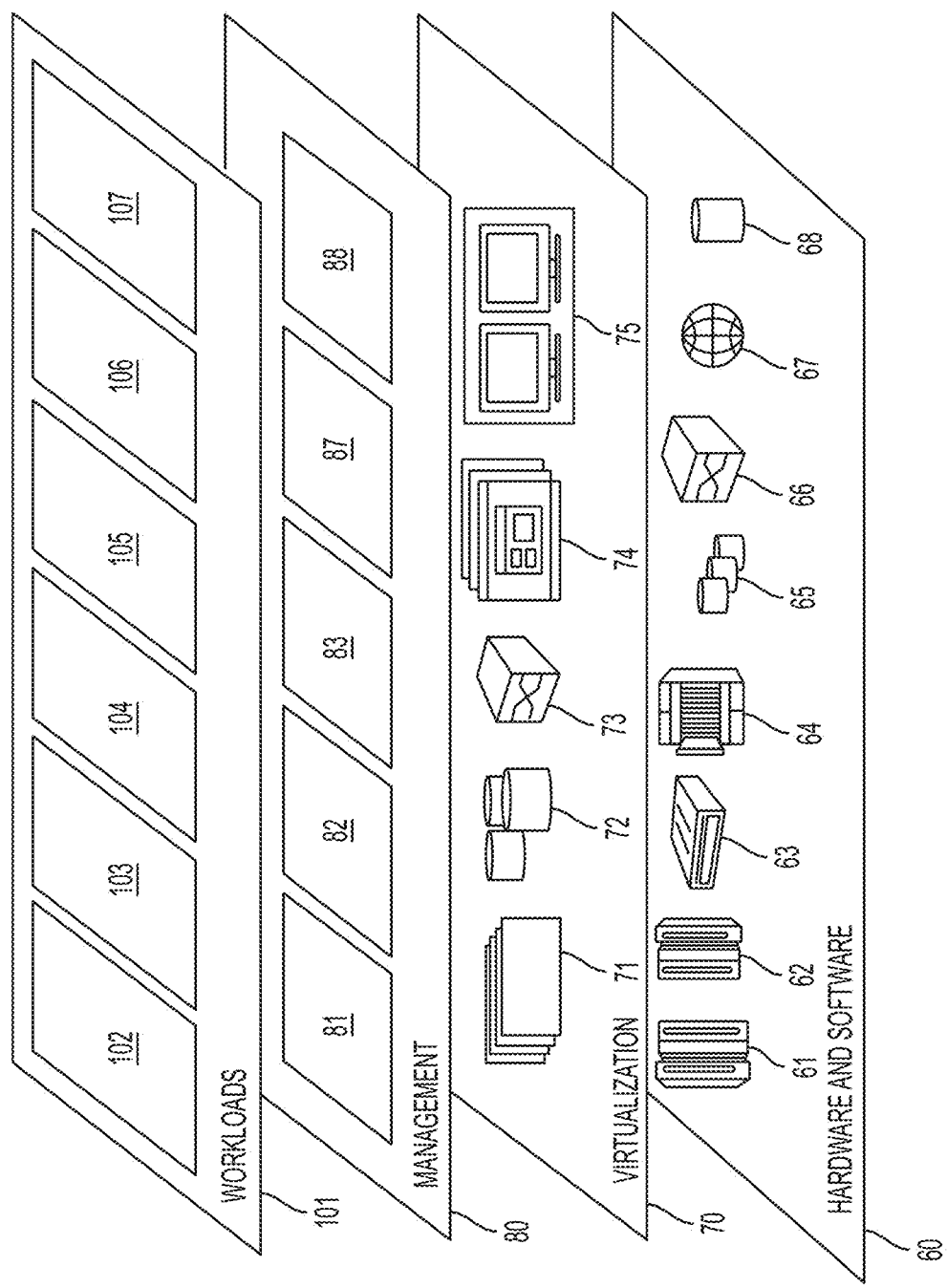
FIG. 9 illustrates a set of functional abstraction layers provided by cloud computing environment, in accordance with embodiments of the present invention.

Referring now to FIG. 9, a set of functional abstraction layers provided by cloud computing environment 50 (see FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and improving network media technology by automatically retrieving digital media content and configuring portions of the digital media content for automated network transmission and presentation 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:

retrieving in real time, by a processor of a hardware device in response to a user command, digital media content;

dividing, by the processor, said digital media content into groups each comprising similar digital media portions of said digital media content;

assigning, by said processor, a digital tag to each group of said groups, wherein each said digital tag digitally describes media elements within each portion of said similar digital media portions, and wherein said media elements describe social network platforms associated with said user;

analyzing, by said processor, each said portion with respect to said media elements;

generating, by said processor based on results of said analyzing, metadata describing each media element of said media elements;

assigning, by said processor, said metadata to each said media element; and configuring, by said processor in response to user instructions and said metadata, said groups of said similar digital media portions of said digital media content for automated presentation for a plurality of users thereby improving real-time digital media capture and presentation;

integrating, by said processor in response to said configuring, a group of digital photo frames with a plurality of social networks of said social network platforms;

assigning, by said processor in response to said configuring, a group of digital media portions of said groups to a digital photo frame of said group of digital photo frames associated with a specified user of said plurality of users, wherein said specified user and said user are communicatively connected via a first social network of said plurality of social networks;

detecting, by said processor in response to said configuring, comments associated with said group of digital media portions and presented via said first social network; and automatically presenting to said specified user by said processor via said digital photo frame, said group of digital media portions and said comments.

2. The method of claim 1, further comprising:
assigning, by said processor based on results of said configuring, a first group of said groups to a first user of said plurality of users;
automatically transmitting, by said processor to said first user, said first group resulting in an automated presentation of said first group for said first user.

3. The method of claim 2, further comprising:
detecting, by said processor via a plurality of sensor devices, user reactions and associated gestures of said first user in response to said automated presentation;
analyzing, by said processor, said user reactions and said associated gestures of said first user;
assigning, by said processor based on results of said analyzing, additional groups of said groups to said first user; and
automatically transmitting, by said processor to said first user, said additional groups resulting in an additional automated presentation of said additional groups for said first user.

4. The method of claim 3, wherein said detecting said user reactions and said associated gestures comprises:
detecting, via biometric sensors, biometric data associated with said first user;
retrieving, via an audio and video retrieval device, audio and video data associated with said first user;
analyzing, by said processor, said audio/video data and said biometric data;
determining, by said processor based on results of said analyzing said audio/video data and said biometric data, a current physiological state of said first user;
comparing, by said processor, said current physiological state of said first user to a baseline physiological state of said first user;
determining, by said processor based on results of said comparing, that said current physiological state of said first user comprises a positive physiological state of said first user; and
generating, by said processor, self-learning software code for executing said configuring and said automated presentation.

5. The method of claim 4, wherein said biometric data is associated with said user attributes of the first user selected from the group consisting of a current respiration rate of said user, a current body temperature of said user, a current perspiration rate of said user, and a current heartrate of said user.

6. The method of claim 1, further comprising:
storing, by said processor, each said group comprising similar digital media portions of said digital media content within an associated specialized portion of a specialized memory device.

7. The method of claim 1, wherein said automated presentation is performed via a device selected from the group consisting of a digital picture frame, an Internet connected television set, and a computer system comprising a GUI.

8. The method of claim 1, further comprising:
broadcasting, by said processor, a digital authorization key, wherein said automated presentation is performed in response to an authorization process executed via said digital authorization key.

9. The method of claim 1, further comprising:
providing at least one support service for at least one of creating, integrating, hosting, maintaining, and deploying computer-readable code in the control hardware, said code being executed by the computer processor to implement: said retrieving, said dividing, said assigning said digital tag, said analyzing, said generating, said assigning said metadata, and said configuring.

10. The method of claim 1, further comprising:
associating, by said processor, said group of digital media portions with background music complementing said group of digital media portions.

11. The method of claim 1, further comprising:
executing, by said processor in response to a touch command, a phone call with an individual within a digital photo of said group of digital media portions.

12. A computer program product, comprising a computer readable hardware storage device storing a computer readable program code, said computer readable program code comprising an algorithm that when executed by a processor of a hardware device implements a method, said method comprising:
retrieving in real time, by said processor in response to a user command, digital media content;
dividing, by said processor, said digital media content into groups each comprising similar digital media portions of said digital media content;
assigning, by said processor, a digital tag to each group of said groups, wherein each said digital tag digitally describes media elements within each portion of said similar digital media portions, and wherein said media elements describe social network platforms associated with said user;
analyzing, by said processor, each said portion with respect to said media elements;
generating, by said processor based on results of said analyzing, metadata describing each media element of said media elements;
assigning, by said processor, said metadata to each said media element; and
configuring, by said processor in response to user instructions and said metadata, said groups of said similar digital media portions of said digital media content for automated presentation for a plurality of users thereby improving real-time digital media capture and presentation;
integrating, by said processor in response to said configuring, a group of digital photo frames with a plurality of social networks of said social network platforms;
assigning, by said processor in response to said configuring, a group of digital media portions of said groups to a digital photo frame of said group of digital photo frames associated with a specified user of said plurality of users, wherein said specified user and said user are communicatively connected via a first social network of said plurality of social networks;
detecting, by said processor in response to said configuring, comments associated with said group of digital media portions and presented via said first social network; and
automatically presenting to said specified user by said processor via said digital photo frame, said group of digital media portions and said comments.

13. The computer program product of claim 12, wherein said method further comprises:
assigning, by said processor based on results of said configuring, a first group of said groups to a first user of said plurality of users;
automatically transmitting, by said processor to said first user, said first group resulting in an automated presentation of said first group for said first user.

14. The computer program product of claim 13, wherein said method further comprises:

detecting, by said processor via a plurality of sensor devices, user reactions and associated gestures of said first user in response to said automated presentation;

analyzing, by said processor, said user reactions and associated gestures of said first user;

assigning, by said processor based on results of said analyzing, additional groups of said groups to said first user; and automatically transmitting, by said processor to said first user, said additional groups resulting in an additional automated presentation of said additional groups for said first user.

15. The computer program product of claim 14, wherein said method further comprises:

wherein said detecting said user reactions and said associated gestures comprises:

detecting, via biometric sensors, biometric data associated with said first user;

retrieving, via an audio and video retrieval device, audio and video data associated with said first user;

analyzing, by said processor, said audio/video data and said biometric data;

determining, by said processor based on results of said analyzing said audio/video data and said biometric data, a current physiological state of said first user;

comparing, by said processor, said current physiological state of said first user to a baseline physiological state of said first user;

determining, by said processor based on results of said comparing, that said current physiological state of said first user comprises a positive physiological state of said first user; and generating, by said processor, self-learning software code for executing said configuring and said automated presentation.

16. The computer program product of claim 15, wherein said biometric data is associated with said user attributes of the first user selected from the group consisting of a current respiration rate of said user, a current body temperature of said user, a current perspiration rate of said user, and a current heartrate of said user.

17. The computer program product of claim 12, wherein said method further comprises:

storing, by said processor, each said group comprising similar digital media portions of said digital media content within an associated specialized portion of a specialized memory device.

18. The computer program product of claim 12, wherein said automated presentation is performed via a device selected from the group consisting of a digital picture frame, an Internet connected television set, and a computer system comprising a GUI.

19. The computer program product of claim 12, wherein said method further comprises:

broadcasting, by said processor, a digital authorization key, wherein said automated presentation is performed in response to an authorization process executed via said digital authorization key.

20. A hardware device comprising a processor coupled to a computer-readable memory unit, said memory unit comprising instructions that when executed by the computer processor implements a method comprising:

retrieving in real time, by said processor in response to a user command, digital media content;

dividing, by said processor, said digital media content into groups each comprising similar digital media portions of said digital media content;

assigning, by said processor, a digital tag to each group of said groups, wherein each said digital tag digitally describes media elements within each portion of said similar digital media portions, and wherein said media elements describe social network platforms associated with said user;

analyzing, by said processor, each said portion with respect to said media elements;

generating, by said processor based on results of said analyzing, metadata describing each media element of said media elements;

assigning, by said processor, said metadata to each said media element; and configuring, by said processor in response to user instructions and said metadata, said groups of said similar digital media portions of said digital media content for automated presentation for a plurality of users thereby improving real-time digital media capture and presentation;

integrating, by said processor in response to said configuring, a group of digital photo frames with a plurality of social networks of said social network platforms;

assigning, by said processor in response to said configuring, a group of digital media portions of said groups to a digital photo frame of said group of digital photo frames associated with a specified user of said plurality of users, wherein said specified user and said user are communicatively connected via a first social network of said plurality of social networks;

detecting, by said processor in response to said configuring, comments associated with said group of digital media portions and presented via said first social network; and automatically presenting to said specified user by said processor via said digital photo frame, said group of digital media portions and said comments.

* * * * *